(12) United States Patent
Burchardt et al.

(10) Patent No.: US 11,919,203 B2
(45) Date of Patent: Mar. 5, 2024

(54) MOLD FOR MANUFACTURING A WIND TURBINE BLADE AND A METHOD FOR MANUFACTURING A WIND TURBINE BLADE

(71) Applicant: Siemens Gamesa Renewable Energy A/S, Brande (DK)

(72) Inventors: Claus Burchardt, Gistrup (DK); Jens Grandjean Joergensen, Aalborg (DK); Mogens Nielsen, Aalborg (DK)

(73) Assignee: SIEMENS GAMESA RENEWABLE ENERGY A/S, Brande (DK)

( * ) Notice: Subject to any disclaimer, the term of this patent is extended or adjusted under 35 U.S.C. 154(b) by 0 days.

(21) Appl. No.: 16/882,576

(22) Filed: May 25, 2020

(65) Prior Publication Data
US 2020/0376719 A1    Dec. 3, 2020

(30) Foreign Application Priority Data

May 28, 2019    (EP) .................................... 19176914

(51) Int. Cl.
| | | |
|---|---|---|
| *B29C 33/20* | (2006.01) | |
| *B29C 33/00* | (2006.01) | |
| *B29D 99/00* | (2010.01) | |
| *F03D 13/10* | (2016.01) | |
| *B29L 31/08* | (2006.01) | |

(52) U.S. Cl.
CPC .......... *B29C 33/20* (2013.01); *B29C 33/0038* (2013.01); *B29C 33/005* (2013.01); *B29D 99/0025* (2013.01); *F03D 13/10* (2016.05); *B29L 2031/085* (2013.01)

(58) Field of Classification Search
CPC ..... B29C 33/0038; B29C 33/20; B29C 33/22; B29C 33/26; B29C 70/00; B29C 33/005; B29C 70/54; B29C 70/36; B29C 33/24; B29C 33/34; B29L 2031/085;
(Continued)

(56) References Cited

U.S. PATENT DOCUMENTS 4,073,609 A * 2/1978 Petrenchik ............ B28B 7/0035
                                                    164/228
4,720,244 A * 1/1988 Kluppel ................ B29C 70/025
                                                    416/224
(Continued)

FOREIGN PATENT DOCUMENTS

| CN | 104626620 | 5/2015 |
|---|---|---|
| CN | 105128353 | 12/2015 |

(Continued)

OTHER PUBLICATIONS

Extended European Search Report in related European Patent Application No. 19176914.0, dated Nov. 12, 2019. 6 pages.

*Primary Examiner* — Emmanuel S Luk
(74) *Attorney, Agent, or Firm* — Schmeiser, Olsen & Watts LLP

(57) ABSTRACT

A mold for manufacturing a wind turbine blade, including: a lower mold component, and an upper mold component, wherein the lower mold component and the upper mold component form a mold cavity in the shape of a wind turbine blade, and the upper mold component includes at least two upper mold parts is provided. The required floor-to-ceiling height of a production hall is decreased and the required lifting capacity of a crane is lowered.

11 Claims, 5 Drawing Sheets

(58) Field of Classification Search
CPC . B29D 99/0025; B29D 99/0028; F03D 13/10; Y02P 70/50; Y02E 10/72
See application file for complete search history.

(56) References Cited

U.S. PATENT DOCUMENTS

| | | | |
|---|---|---|---|
| 5,362,225 A | 11/1994 | Kitano et al. | |
| 7,223,091 B2 * | 5/2007 | Olsen | B29C 69/004 264/319 |
| 8,770,966 B2 * | 7/2014 | Schibsbye | B29C 33/26 425/442 |
| 8,814,558 B2 * | 8/2014 | Schibsbye | B29C 70/48 425/450.1 |
| 8,951,034 B2 * | 2/2015 | Christiansen | B29C 33/306 425/441 |
| 9,102,082 B2 * | 8/2015 | Schibsbye | B29C 31/006 |
| 9,573,325 B2 * | 2/2017 | Davis | B29C 70/345 |
| 9,796,116 B2 * | 10/2017 | Georgs | B29C 31/006 |
| 10,710,321 B2 * | 7/2020 | Datta | F03D 1/0675 |
| 2006/0165838 A1 | 7/2006 | Laar et al. | |
| 2011/0073237 A1 * | 3/2011 | Rajasingam | B29C 33/26 156/60 |
| 2011/0100542 A1 * | 5/2011 | Faulkner | B29C 66/636 425/470 |
| 2011/0142679 A1 | 6/2011 | Bendel et al. | |
| 2011/0260362 A1 * | 10/2011 | Petersen | B29C 33/26 264/294 |
| 2012/0091627 A1 * | 4/2012 | Schibsbye | B29C 70/446 264/258 |
| 2014/0215783 A1 * | 8/2014 | Bech | B29C 31/04 29/23.51 |
| 2015/0308415 A1 * | 10/2015 | Rajasingam | F03D 80/30 156/196 |
| 2015/0336334 A1 * | 11/2015 | Robinson | B29C 70/30 156/245 |
| 2016/0354984 A1 * | 12/2016 | Hedges | B29C 70/38 |
| 2017/0361507 A1 * | 12/2017 | Bendel | B29C 33/307 |
| 2018/0009177 A1 * | 1/2018 | Bendel | B29C 66/547 |
| 2020/0331215 A1 * | 10/2020 | Santoni | B29C 45/04 |

FOREIGN PATENT DOCUMENTS

| | | | | |
|---|---|---|---|---|
| DE | 102008038620 A1 | | 12/2009 | |
| EP | 1310351 | | 5/2003 | |
| EP | 2952315 | * | 12/2015 | |
| JP | 0477214 | | 3/1992 | |
| JP | 2008232141 A | * | 10/2008 | B29C 33/005 |
| JP | 2008232141 A | | 10/2008 | |
| WO | 2013097859 A2 | | 7/2013 | |
| WO | WO-2017009424 A1 | * | 1/2017 | B29C 33/00 |

* cited by examiner

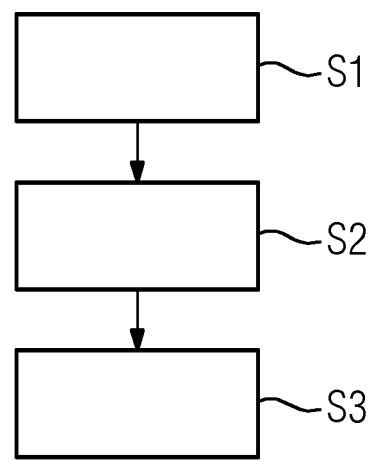

MOLD FOR MANUFACTURING A WIND TURBINE BLADE AND A METHOD FOR MANUFACTURING A WIND TURBINE BLADE

CROSS-REFERENCE TO RELATED APPLICATIONS

This application claims priority to European Patent Application No. 19176914.0, having a filing date of May 28, 2019, the entire contents of which are hereby incorporated by reference.

FIELD OF TECHNOLOGY

The following relates to a mold for manufacturing a wind turbine blade and a method for manufacturing a wind turbine blade using the mold.

BACKGROUND

Conventionally, blades for wind turbines are manufactured in a closed mold with a mold core inside upper and lower mold components forming a mold cavity in the shape of the wind turbine blade. EP 1 310 351 B1 discloses such a process in which, after placing fiber material and core material in the mold cavity, vacuum is applied and a curable resin-like matrix is injected via a filling pipe. Afterwards, the resin-like matrix is cured by applying heat.

The upper mold component used in such a process has high weight and hence requires a crane with a high lifting capacity to lift it on and off the lower mold component. An appropriate crane is an expensive investment. Furthermore, the crane may represent a bottleneck timewise since the crane as well as the crane operator need to be available when an upper mold has to be lifted on or off the lower mold.

In addition to that, the upper mold component requires sufficient structural stiffness and is therefore a tall structure. When lifted on or off the lower mold component, the upper mold component needs to be lifted high enough to have clearance over the wind turbine blade and the wind turbine blade root arranged inside the mold cavity. For that reason, the upper mold component sets the requirements of the floor-to-ceiling height in a production hall. A bigger floor-to-ceiling height increases building costs, whereas a lower floor-to-ceiling height limits the size of the blades that can be manufactured in an existing production hall.

SUMMARY

An aspect relates to providing an improved mold and method for manufacturing a wind turbine blade.

Accordingly, a mold for manufacturing a wind turbine blade is provided. The mold comprises a lower mold component, and an upper mold component, wherein the lower mold component and the upper mold component form a mold cavity in the shape of a wind turbine blade, and the upper mold component comprises at least two upper mold parts.

The mold is advantageous in that the requirements for the floor-to-ceiling height of a production hall are decreased for a given blade size since lifting the upper mold component above the height of the wind turbine blade is not required anymore. Further, requirements regarding the crane capacity in the production hall are also decreased since each of the upper mold parts has less weight than an upper mold component forming a single piece. Accordingly, a crane with a lower lifting capacity suffices.

According to an embodiment, at least one of the upper mold parts is configured to be moved sideways and/or to rotate with respect to the lower mold component to open the mold cavity.

Moving sideways means that the upper mold part performs a lateral (horizontal) movement with respect to the lower mold component. Rotating means that the upper mold part performs a movement around a rotation axis which is in parallel to the longitudinal axis of the wind turbine blade.

According to a further embodiment, at least one of the upper mold parts is movably connected to the lower mold component to open and close the mold cavity. "Movably connected" includes means connecting the upper mold part and the lower mold component and allowing relative displacement and/or rotation.

According to a further embodiment, at least one of the upper mold parts is rotatably connected to the lower mold component to open and close the mold cavity.

A rotatable connection may be realized with hinges that connect an upper mold part and the lower mold component, wherein the hinges may be attached to a side wall of the lower mold component.

According to a further embodiment, the mold comprises guide rails configured to guide, for opening the mold cavity, one of the upper mold parts from a position in which the mold cavity is closed to a position in which the upper mold part is positioned adjacent to the lower mold component and the mold cavity is open.

This allows easy operability of the mold.

According to a further embodiment, at least one of the upper mold parts is configured to serve as a scaffolding for workers to stand on and reach into the mold cavity.

This has the advantage that the upper mold part even serves a function when the mold is open, hence rendering the use of an additional scaffolding superfluous and thereby saving space in a production hall.

According to a further embodiment, the scaffolding is provided by rotating the upper mold part with respect to the lower mold component into a position in which the upper mold part is adjacent to the lower mold component.

According to a further embodiment, the scaffolding is provided by moving the upper mold part sideways and downwards with respect to the lower mold component into a position in which the upper mold part is adjacent to the lower mold component.

According to a further embodiment, the scaffolding is configured to rotate so as to form a horizontal platform when the least one of the upper mold parts has been moved sideways and/or rotated with respect to the lower mold component to open the mold cavity.

According to a further embodiment, the mold comprises an actuator configured to move at least one of the upper mold parts sideways and/or to rotate at least one of the upper mold parts.

This has the advantage that an opening and closing of the mold can be carried out without the need of an external or additional crane. The actuator is, for example, a hydraulic piston or a threaded spindle driven by an electric motor.

According to a further embodiment, the upper mold parts are split along a longitudinal axis of the wind turbine blade and/or wherein the upper mold parts are split along a transverse axis of the wind turbine blade.

Providing an upper mold component which is split along the longitudinal axis as well as the transverse axis has the advantage that multiple spanwise upper mold parts can be obtained which further eases handling for each of the upper mold parts due to a reduced weight and smaller dimensions. Further, costs are reduced since the upper mold parts are lighter and need less material.

According to a further embodiment, the mold comprises a sealing means configured to seal the upper mold parts against each other, wherein, the sealing means is arranged on the outer surface of the upper mold parts or between the upper mold parts.

The sealing means is configured to maintain a vacuum during the resin infusion process.

According to a further aspect, the present invention relates to a method for manufacturing a wind turbine blade using the aforesaid mold.

According to an embodiment, the method comprises moving at least one of the upper mold parts sideways and/or rotating at least one of the upper mold parts with respect to the lower mold component to give access to the lower mold component.

According to a further embodiment, the wind turbine blade is manufactured inside the mold by an autoclave process and/or a resin infusion process and/or by applying vacuum to the mold cavity.

The resin is, for example, an epoxy. A lay-up of fibers (glass, carbon, etc.) inside the closed mold cavity is infused with the resin using vacuum. Heat is applied to cure the resin.

The embodiments and features described with reference to the apparatus of the present invention apply mutatis mutandis to the method of the present invention.

Further possible implementations or alternative solutions of the embodiment of the present invention also encompass combinations—that are not explicitly mentioned herein—of features described above or below with regard to the embodiments. The person skilled in the art may also add individual or isolated aspects and features to the most basic form of the present invention.

BRIEF DESCRIPTION

Some of the embodiments will be described in detail, with reference to the following figures, wherein like designations denote like members, wherein:

FIG. 9 depicts a flowchart illustrating a method of manufacturing a wind turbine blade using the mold.

DETAILED DESCRIPTION

Figure 1:
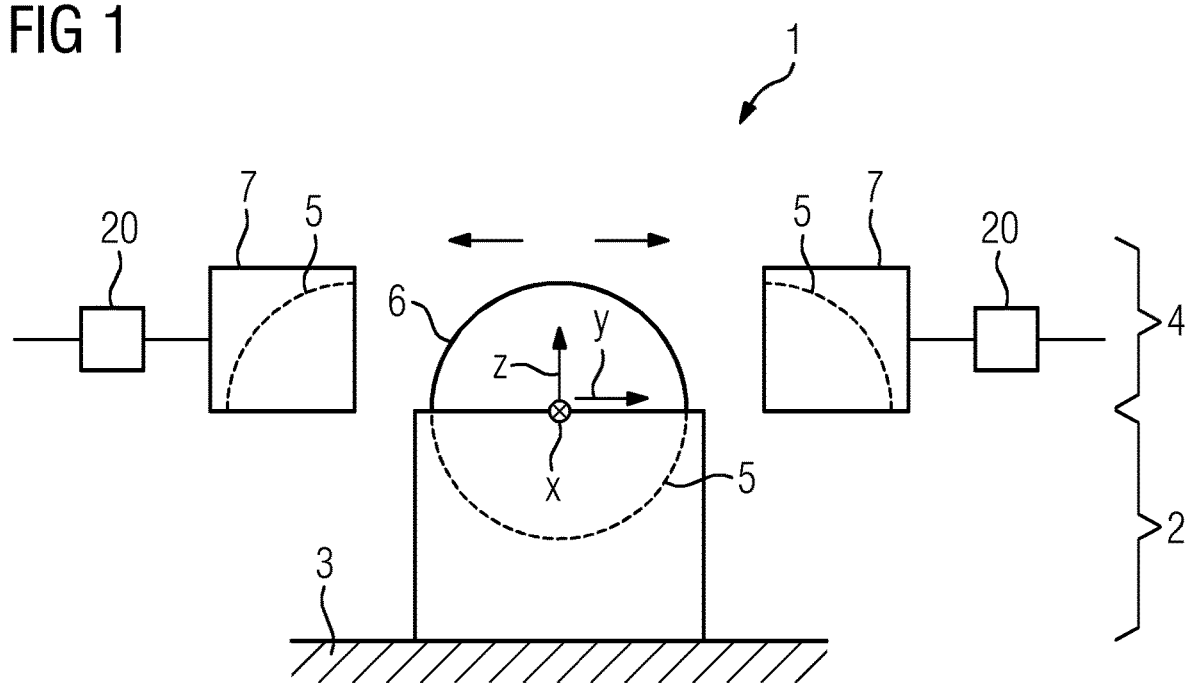
FIG. 1 depicts, in cross-section, a mold for manufacturing a wind turbine blade according to an embodiment.

In the Figures, like reference numerals designate like or functionally equivalent elements, unless otherwise indicated.

FIG. 1 shows a mold for manufacturing a wind turbine blade according to an embodiment.

The mold 1 comprises a lower mold component 2 which is arranged on the floor 3 of a production hall and an upper mold component 4. The lower mold component 2 and the upper mold component 4 may form a mold cavity 5 in the shape of a wind turbine blade 6. The upper mold component 4 comprises two upper mold parts 7 which, for example, may be arranged on the lower mold component 2 using a crane.

According to the embodiment of FIG. 1, a (cured) wind turbine blade 6 is located in the cavity 5 of the lower mold component 2. In order to access the cavity 5, the upper mold parts 7 are moved sideways as indicated by the arrows. Hence, the wind turbine blade 6 is exposed without the need to lift the upper mold parts 7 above the maximum height of the wind turbine blade 6 (the height corresponds to the z-direction in FIG. 1).

The upper mold component 4 is thus split sideways (said direction is designated y) into the two upper mold parts 7, i.e. in the horizontal direction and at right angles with respect to the longitudinal direction x of the wind turbine blade 6. Also, the upper mold component 4 may be split in multiple upper mold parts in the x direction (not shown).

Placing the upper mold parts 7 on the lower mold component 2a (closed mold cavity 5) and removing the same again (open mold cavity 5) may be achieved using a crane with a lifting yoke to evenly distribute the loads caused by the upper mold parts 7. Or, as illustrated in FIG. 2, hydraulic pistons 20 are provided which are configured to move each upper mold part 7 so as to open and close the mold cavity 5, in particular sideways.

Figure 2:
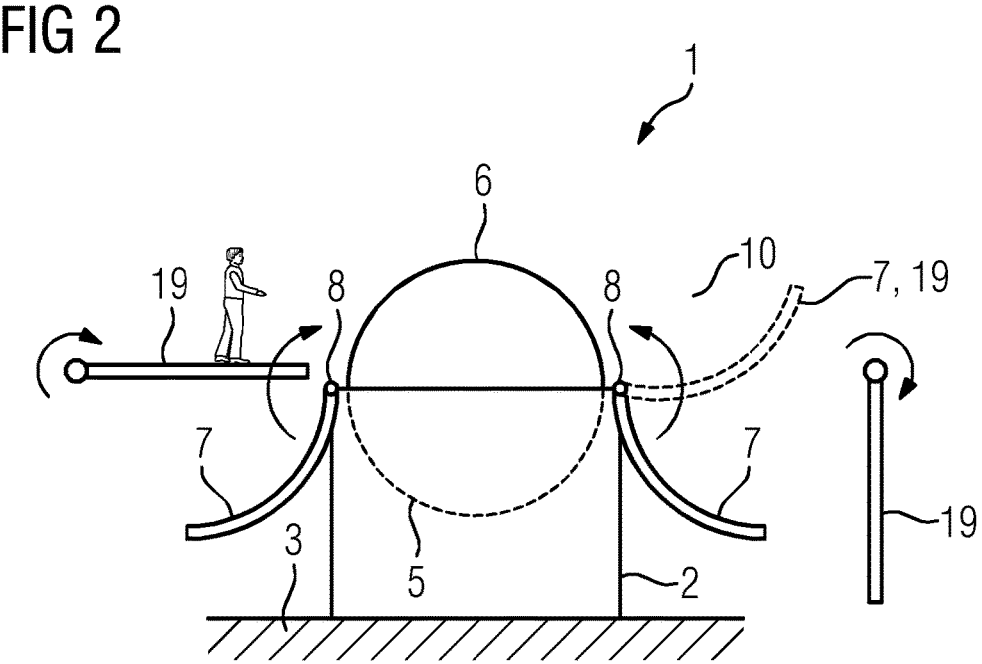
FIG. 2 depicts, in cross-section, a mold for manufacturing a wind turbine blade according to another embodiment.

FIG. 2 shows a mold for manufacturing a wind turbine blade according to another embodiment.

According to the embodiment of FIG. 2, the upper mold parts 7 are movably connected to the lower mold component 2 to open and close the mold cavity 5. A movement from a position in which both upper mold parts 7 are positioned adjacent to the lower mold component 2 and the mold cavity 5 is open to a position in which the mold cavity 5 is closed is indicated by the arrows.

In the present case, the upper mold parts 7 are rotatably connected to the lower mold component 2 by means of hinges 8. A respective axis of rotation extends parallel to the wind turbine blade 6 (lengthwise direction x). When arranged in an intermediate position (between the fully open and closed position—indicated in dashed lines), the upper mold parts 7 may serve as a scaffolding 19 to stand on and reach into the mold cavity 5. Or, a scaffolding 19 may be rotated to provide a horizontal platform where the upper mold parts 7 have been rotated into their fully open position.

Figure 3:
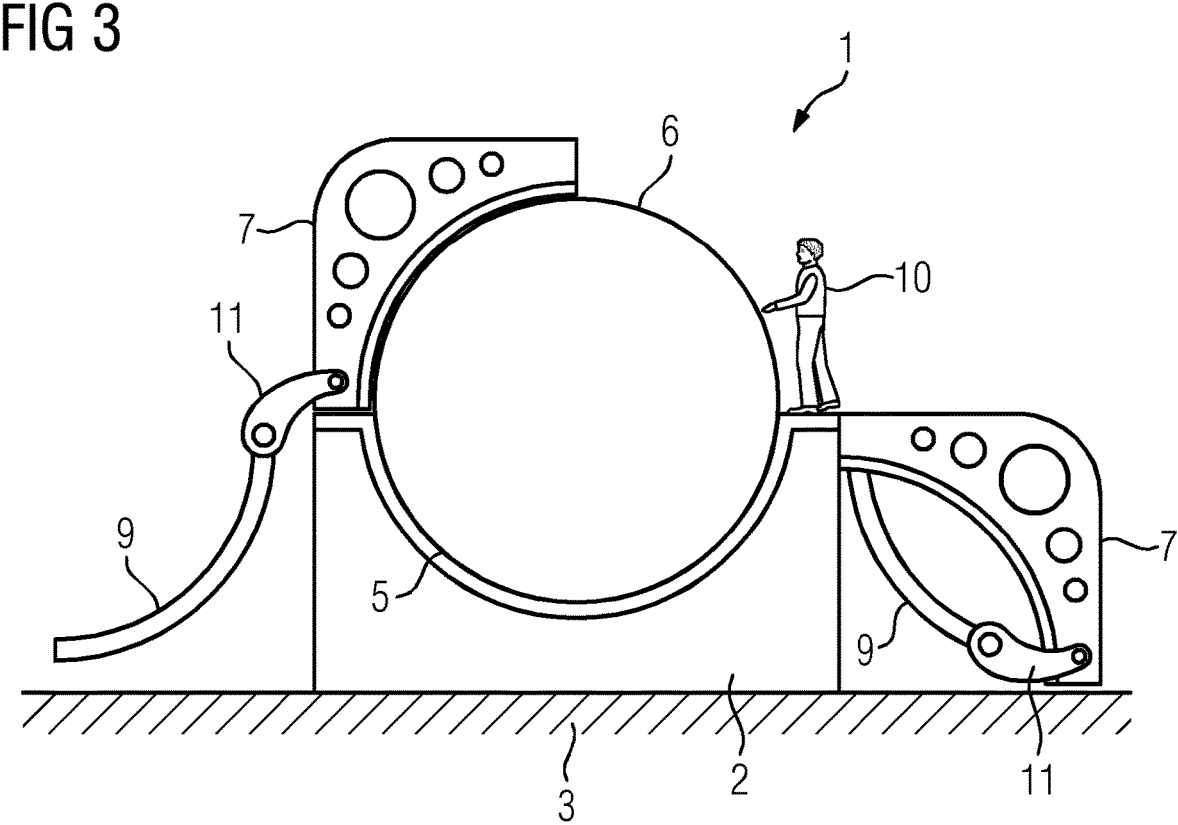
FIG. 3 depicts, in cross-section, a mold for manufacturing a wind turbine blade according to yet another embodiment.

FIG. 3 shows a mold for manufacturing a wind turbine blade according to yet another embodiment.

According to this embodiment, the mold 1 comprises guide rails 9 which are configured to guide, for opening the mold cavity 5, the upper mold parts 7 from a position in which the mold cavity 5 is closed to a position in which the upper mold parts 7 are positioned adjacent to the lower mold component 2 and the mold cavity 5 is open. In the present case, only the upper mold part 7 on the right side is positioned adjacent to the lower mold component 2.

The upper mold part 7 on the right side of FIG. 3 serves as a scaffolding 19 for a worker 10 to stand on and reach into the mold cavity 5. The scaffolding 19 is provided by moving the upper mold part 7 sideways and downwards with respect to the lower mold component 2 into a position in which the upper mold part 7 is adjacent to the lower mold component 2. For example, the upper mold parts 7 are connected to the guide rails 9 using levers 11 which slide in the guide rails 9.

Figure 4:
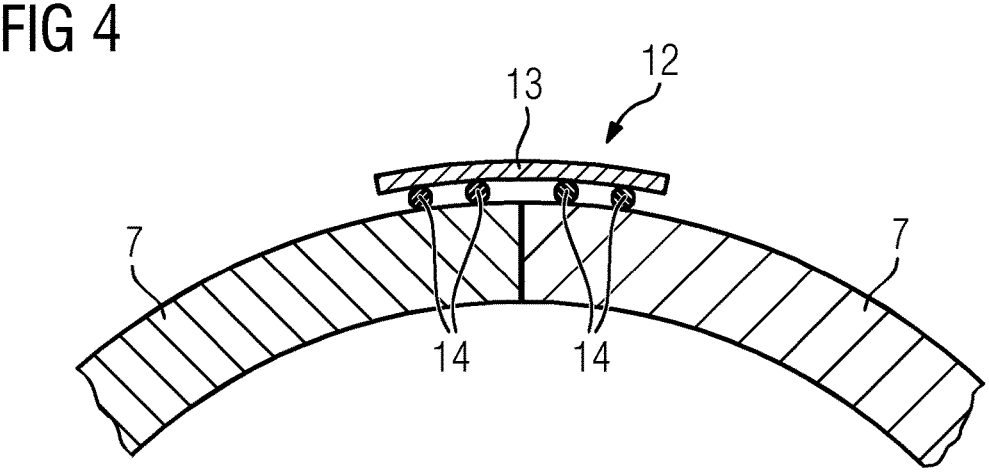
FIG. 4 depicts, in cross-section, a sealing means for a mold according to an embodiment.

FIG. 4 shows a sealing means 12 for a mold 1 according to an embodiment.

The sealing means 12 is configured to seal the upper mold parts 7 against each other and is arranged on the outer surface of the upper mold parts 7. According to the present embodiment, the sealing means 12 comprises a plate 13 and seals 14 sandwiched between the plate 13 and the upper mold parts 7.

Figure 5:
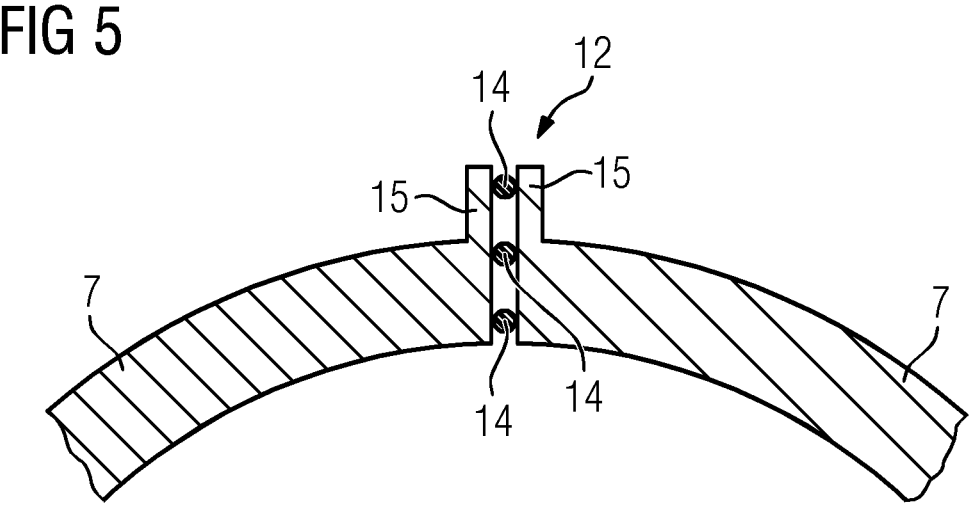
FIG. 5 depicts, in cross-section, a sealing means for a mold according to another embodiment.

FIG. 5 shows a sealing means 12 for a mold 1 according to another embodiment.

The sealing means 12 in FIG. 5 is arranged between the upper mold parts 7. For that purpose, end portions of the upper mold parts 7 are equipped with a flange 15 and seals 14 are arranged between the flanges 15.

Figure 6:
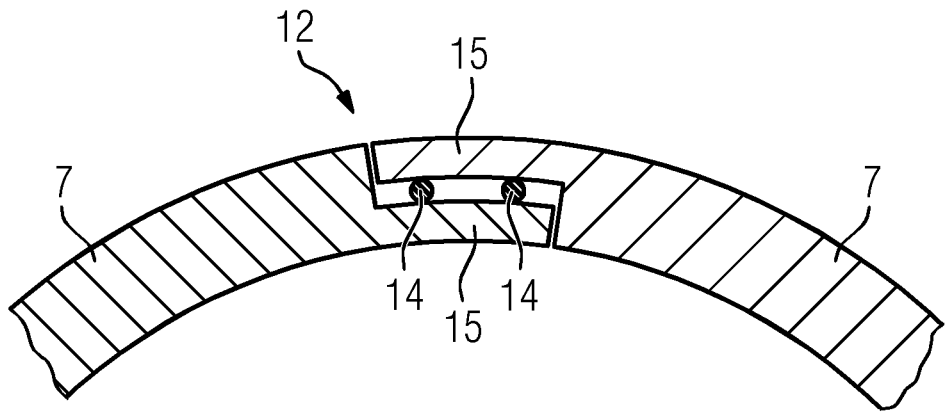
FIG. 6 depicts, in cross-section, a sealing means for a mold according to yet another embodiment.

FIG. 6 shows a sealing means 12 for a mold 1 according to yet another embodiment.

The sealing means 12 of FIG. 6 is also arranged between the upper mold parts 7. Each of the upper mold parts 7 comprises an end portion forming a step 15, wherein the steps 15 are formed complementary to each other. Furthermore, seals 14 are arranged between the steps 15 to connect the upper mold parts 7 to each other.

Figure 7:
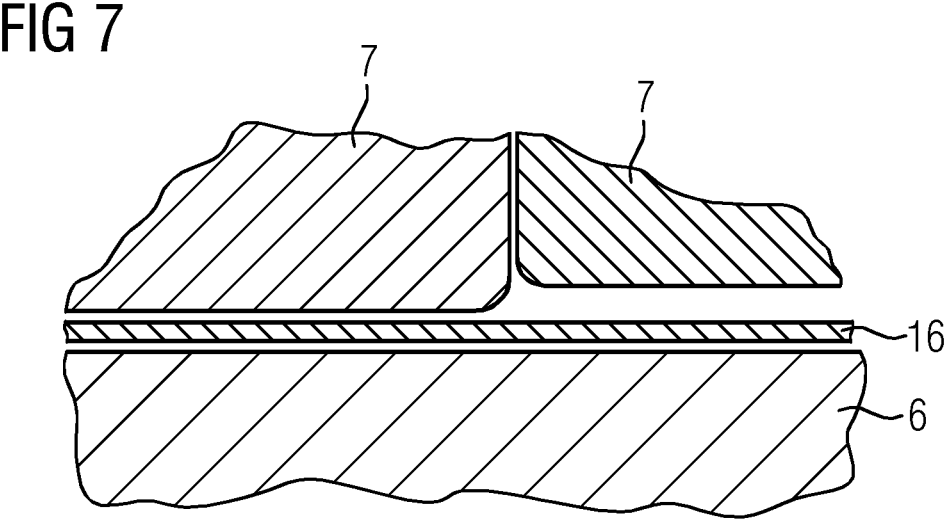
FIG. 7 depicts, in cross-section, two upper mold parts not properly aligned to each other when the mold cavity is closed.

FIG. 7 shows two upper mold parts 7 which are not properly aligned to each other when the mold 1 is closed.

Such a misalignment may be caused due to tolerances that may occur during manufacturing of the upper mold parts 7. In order to avoid a negative impact on the manufacturing of a wind turbine blade 6, an additional plate 16 is positioned between the wind turbine blade 6 and the upper mold parts 7. The plate 16 may be made of polypropylene, for example. By providing such a plate 16, the transition between the upper mold parts 7 can be smoothened and hence larger tolerances of the mold geometry may be allowed.

Figure 8:
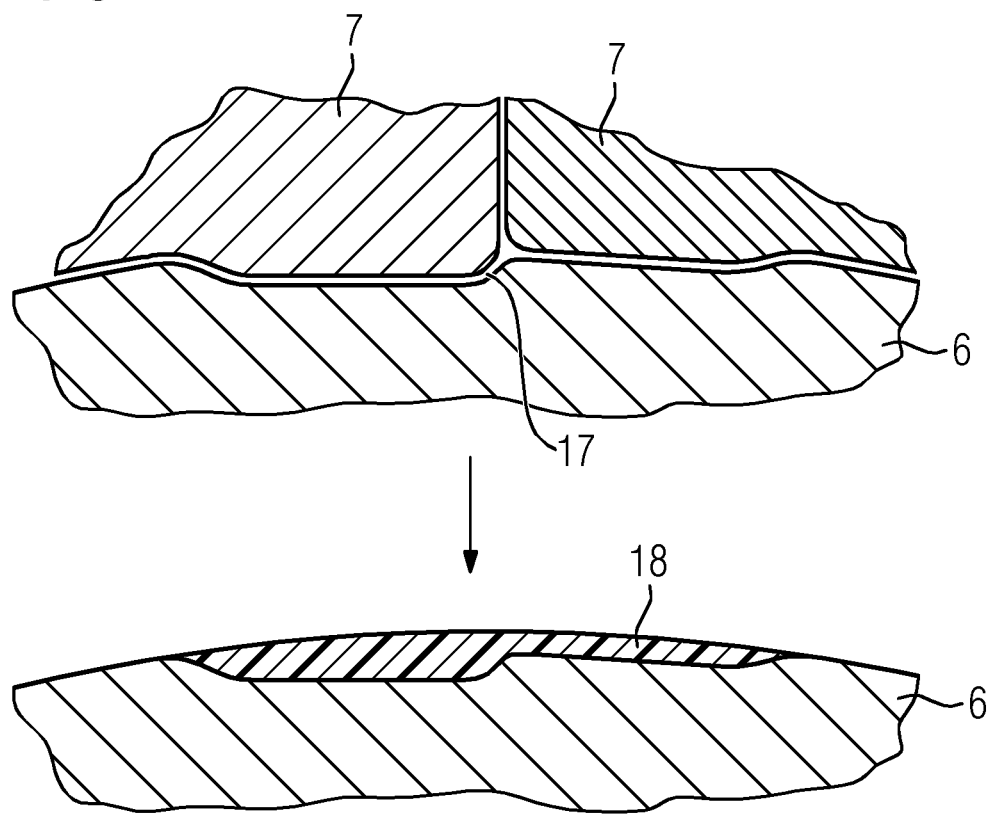
FIG. 8 depicts, in cross-section, a recess caused by misaligned upper mold parts that is filled with a filler.

FIG. 8 shows a recess caused by misaligned upper mold parts 7 that is filled with a filler.

In case the upper mold parts 7 are not properly aligned to each other when the mold 1 is closed, for example due to variances caused in the production of the upper mold parts 7, and a plate 16 has not been positioned between the wind turbine blade 6 and the upper mold parts 7, a recess 17 might be caused. Such a recess 17 in a casted wind turbine blade 6 is treated by filling it with a suitable filler 18 after the upper mold parts have been moved sideways or have been rotated to gain access to the wind turbine blade 6.

Hence, this approach allows larger tolerances of the mold geometry in the manufacturing of upper mold parts 7 as well. Thus, upper mold parts 7 can be aligned to each other regardless of their actual shape.

FIG. 9 shows a flowchart illustrating a method for manufacturing the wind turbine blade 6 using the mold 1.

In a step S1, after placing fiber material and possibly other core materials in the mold cavity 5 to form a wind turbine blade 6, the upper mold parts 7 are moved sideways (and possibly upwards) and/or are rotated with respect to the lower mold component 2 to close the mold cavity 5.

In a step S2, the wind turbine blade 6 is manufactured inside the mold 1 by an autoclave process and/or a resin infusion process and/or by applying vacuum to the mold cavity 5.

In a step S3, the mold 1 is opened by moving the upper mold parts 7 sideways (and possibly downwards) and/or rotating the upper mold parts 7 with respect to the lower mold component 2 to give access to the lower mold component 2.

The casted wind turbine blade 6 is then taken out of the mold cavity 5, possibly after being treated as explained in connection with FIG. 8.

Although the present invention has been described in accordance with preferred embodiments, it is obvious for the person skilled in the art that modifications are possible in all embodiments.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

What is claimed:

1. A mold for manufacturing a wind turbine blade, the mold comprising:
   a single stationary lower mold component that forms a bottom half of a mold cavity, wherein the single stationary lower mold is arranged directly on a floor surface; and
   an upper mold component that forms a top half of the mold cavity and is split into a first upper mold part, which forms a first portion of the top half of the mold cavity, and a second upper mold part, which forms a second portion of the top half of the mold, along a longitudinal axis of the wind turbine blade, the first upper mold part and the second upper mold part movably connected to the single stationary lower mold component at opposing ends of the single stationary lower mold component;
   wherein at least one of the first upper mold part and the second upper mold part is movable with respect to the single stationary lower mold component such that, when moved into a position next to the single stationary lower mold component, an outer surface of at least one of the first upper mold part and the second upper mold part forms a scaffolding adjacent to the single stationary lower mold component;
   wherein the single stationary lower mold component and the upper mold component form the mold cavity in a shape of the wind turbine blade.

2. The mold according to claim 1, wherein the scaffolding is for workers to stand on and reach into the mold cavity.

3. The mold according to claim 1, further comprising an additional scaffolding that is a horizontal platform rotated into position adjacent the mold cavity, when the at least one of the first upper mold part and the second upper mold part has been rotated into an open position.

4. The mold according to claim 1, further comprising an actuator configured to move at least one of the first upper mold part and the second upper mold part.

5. The mold according to claim 1, wherein the first upper mold part and the second upper mold part are further split along a transverse axis of the wind turbine blade.

6. The mold according to claim 1, further comprising a sealing means configured to seal the first upper mold part and the second upper mold part against each other, wherein, the sealing means is arranged on an outer surface of the first upper mold part and the second upper mold part or between the first upper mold part and the second upper mold part.

7. The mold according to claim 1, wherein the bottom half of the mold is a continuous surface defined by the single stationary lower mold component.

8. The mold according to claim 1, further comprising guide rails, wherein the first upper mold part and the second upper mold part are connected to the guide rails using levers which slide in the guide rails to move at least one of the first upper mold part and the second upper mold part with respect to the single stationary lower mold component.

9. A method comprising: manufacturing the wind turbine blade using the mold according to claim 1.

10. The method according to claim 9, further comprising moving at least one of the first upper mold part and the second upper mold part with respect to the stationary lower mold component to form the scaffolding.

11. The method according to claim 9, wherein the wind turbine blade is manufactured inside the mold by an autoclave process and/or a resin infusion process and/or by applying vacuum to the mold cavity.

* * * * *